No. 635,308. Patented Oct. 24, 1899.
C. FELLNER & J. STEIMLE.
APPARATUS FOR MAKING AMMONIA.
(Application filed Dec. 29, 1897.)

(No Model.) 4 Sheets—Sheet 1.

Witnesses:
E. B. Bolton

Inventors:
Christian Fellner
Johann Steimle
By
their Attorneys

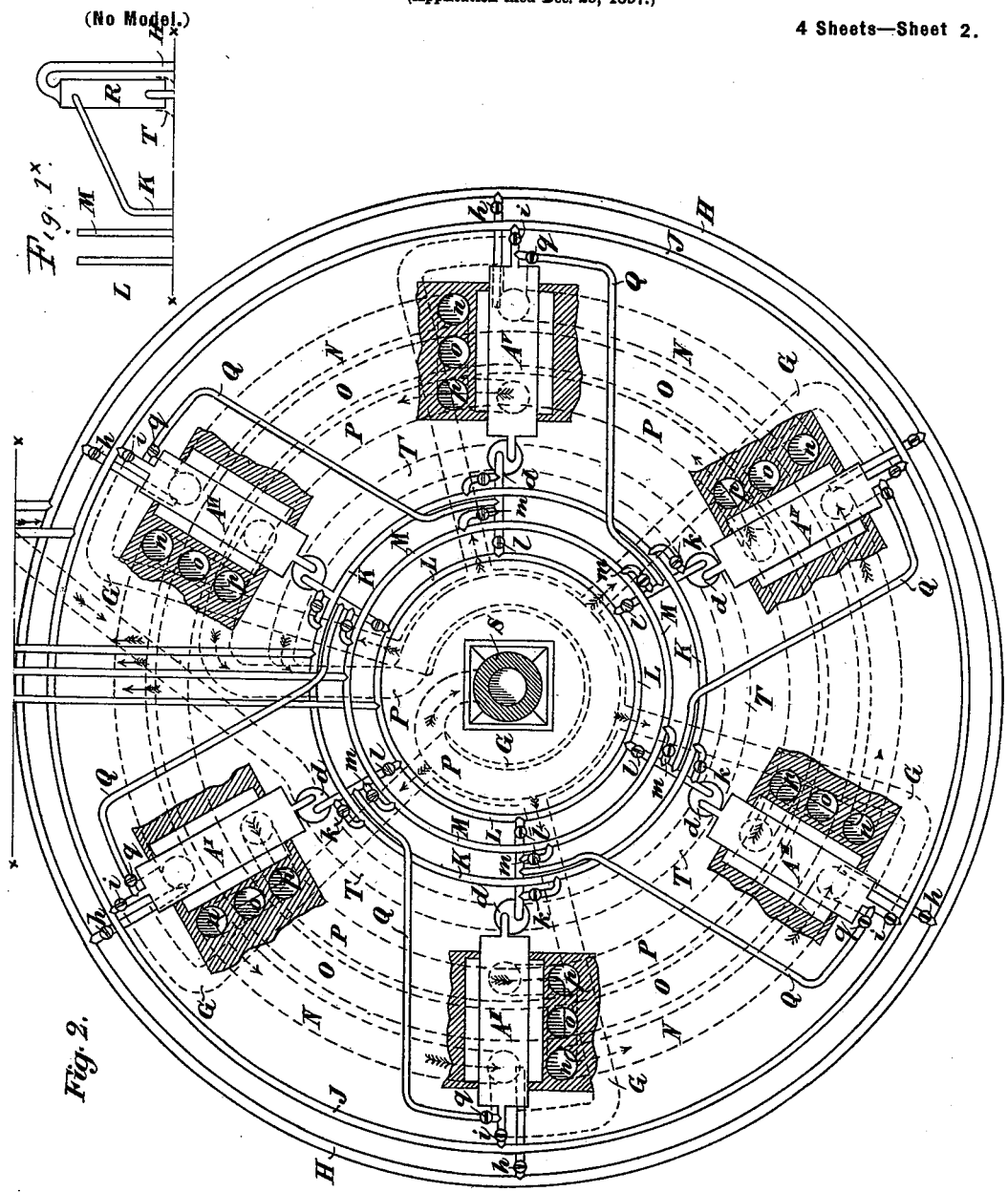

No. 635,308.  Patented Oct. 24, 1899.
C. FELLNER & J. STEIMLE.
APPARATUS FOR MAKING AMMONIA.
(Application filed Dec. 29, 1897.)
(No Model.)  4 Sheets—Sheet 3.
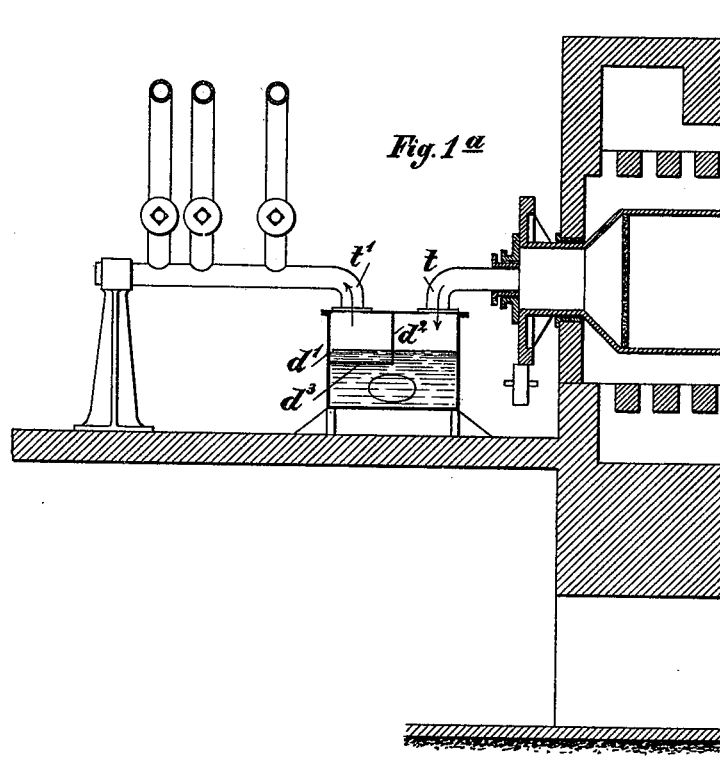
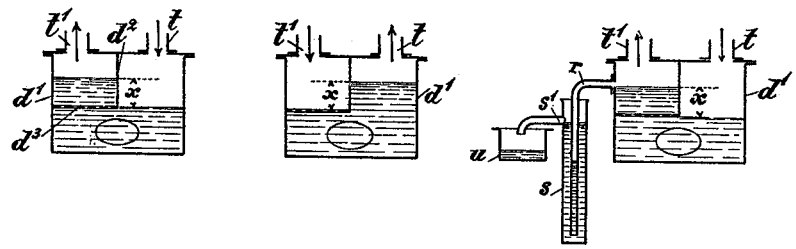
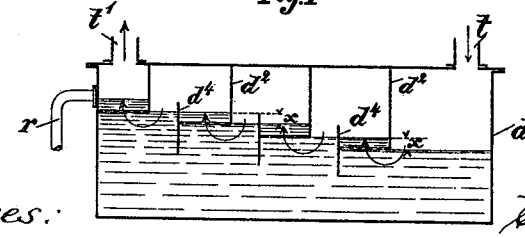

No. 635,308. Patented Oct. 24, 1899.
C. FELLNER & J. STEIMLE.
APPARATUS FOR MAKING AMMONIA.
(Application filed Dec. 29, 1897.)

(No Model.) 4 Sheets—Sheet 4.

Witnesses:
E. B. Rolton

Inventors:
Christian Fellner
Johann Steimle
By
their Attorneys

THE NORRIS PETERS CO., PHOTO-LITHO., WASHINGTON, D. C.

UNITED STATES PATENT OFFICE.

CHRISTIAN FELLNER AND JOHANN STEIMLE, OF FRANKFORT-ON-THE-MAIN, GERMANY, ASSIGNORS TO FELLNER & ZIEGLER, OF SAME PLACE.

APPARATUS FOR MAKING AMMONIA.

SPECIFICATION forming part of Letters Patent No. 635,308, dated October 24, 1899.

Application filed December 29, 1897. Serial No. 664,281. (No model.)

*To all whom it may concern:*

Be it known that we, CHRISTIAN FELLNER and JOHANN STEIMLE, subjects of the Emperor of Germany, residing at Frankfort-on-the-Main, Germany, have invented new and useful Improvements in Apparatus for Extracting Ammonia and By-Products from Nitrogenous Organic Materials, of which the following is a specification.

This invention has been patented in France, No. 245,122, dated February 14, 1895; in Hungary, No. 4,755, dated December 5, 1895; in Austria, No. 2,944/47, dated July 7, 1897, and No. 3,878/47, dated September 13, 1897; in England, No. 12,614, dated May 21, 1897, and No. 17,644, dated July 27, 1897; in Canada, No. 55,128, dated May 8, 1896, and in Germany, No. 92,711, dated April 10, 1897, and No. 93,741, dated June 18, 1897.

Our invention relates to an apparatus used singly or in a connected series for the treatment of nitrogenous substances, especially of a combustible nature, such as peat and the like; and its chief object is the extraction of ammonia from said substances by successively drying the raw material, then slowly coking (smothering and distilling) the dried material, and finally steaming the remaining product. Under the steaming action the coked material generates water, gas, and ammonia, and the latter is separated from the former by absorption.

Figure 1:
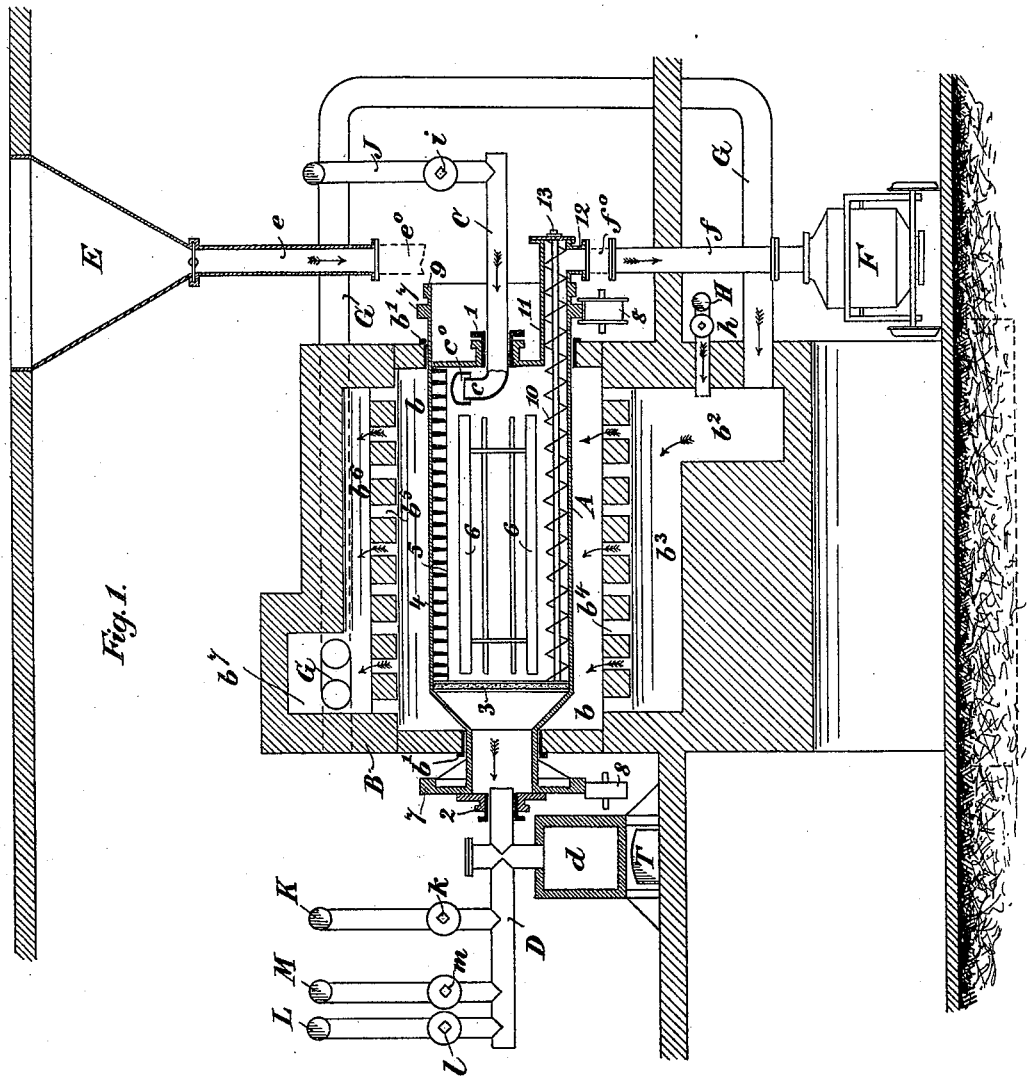
Figure 3:
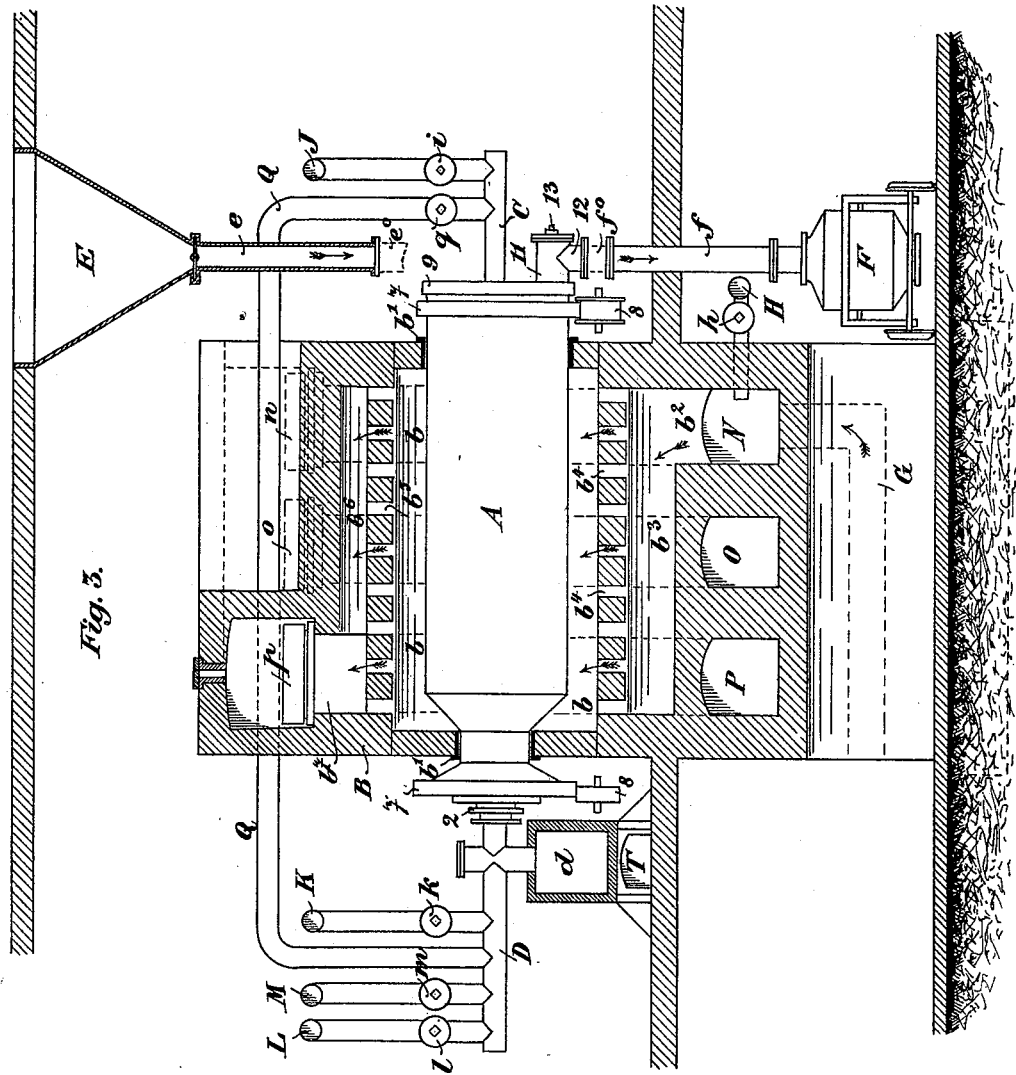

In the accompanying drawings, Figure 1 shows a single oven and retort in longitudinal section. Fig. 1$^\times$ is a view of the portion of the apparatus beyond the line X X of Fig. 1, this portion being omitted from Fig. 1 from lack of space. Figs. 1$^a$, 1$^b$, 1$^c$, 1$^d$, and 1$^e$ show modifications of means for washing the gas and freeing it from impurities. Fig. 2 is a diagram showing a series or a battery of ovens and retorts connected so as to utilize the gases and vapors generated more economically. Fig. 3 is a sectional view of one of the ovens and retorts of the battery.

We will first describe the single oven and retort and then the series or battery. The cylindrical retort A is rotatable around its horizontal axle inside of the oven B. The steam-inlet C and the outlet-tube D for the gaseous products enter the retort at each extremity through stuffing-boxes 1 2. Both inlets are protected against dirt, the inlet-tube C being directed upward and covered by a cap $c^0$. The outlet-tube D may be protected in the same manner or by a partition 3 in the retort across the opening in the tube in the shape of a sieve. A dust-collector $d$ may be used in the gas-conducting tube outside the retort; but in this case the collector must be heated, as at T, in order to prevent the gaseous products from precipitating.

The wall of the retort A is provided with longitudinal or cross ribs 4 5, or both, in order to strengthen the walls and allow them to be made thin and light, and at the same time the transmission of heat by the thin wall and the ribs will be greater and the elevated temperature will be less injurious to the wall by its combination with the ribs.

In order to loosen the charge within the retort, the parts of which are carried upwardly by the revolving of the retort and drop down again through the center thereof, we provide a cage made of spring-rails 6 or use some similar devices.

The retort is carried at each end upon rollers 8 by a circular flange 7, and a toothed ring 9 at one end gears with suitable mechanism to rotate the retort. Both openings of the oven, through which the retort projects outside, are calked by means of divided rings $b'$.

The best device for filling and emptying the retort we have found to be a feeding-screw 10, mounted inside the retort along the cylindrical wall of the same. This screw is prolonged outside one of the extremities of the retort and has a casing 11, and its axle passes through the same and is put in motion from outside by any suitable driving means.

The casing 11 is provided with a lateral socket 12, which is opened for the charging or emptying of the retort. In charging in the upper position of the socket it connects with the hopper E through the pipe $e$ and tube $e^0$, and in the position shown in Fig. 1 the contents of the retort are emptied through the pipe $f$ and the connecting-piece $f^0$ into the movable vessel F.

The oven B is provided with a heating-chamber $b$, and inside of this the retort rotates.

We have shown in the drawings that the heating is done by gas. This enters the mixing and igniting chamber $b^2$ from the gas-supply pipe H through the stop-cock $b^2$, while heated air for combustion flows at the same time into the chamber $b^2$ through the air-conducting pipe G. The ignited mixture reaches the flame-chamber $b^3$ and after having passed through the openings $b^4$ circulates around the retort in the heating-chamber $b$, after which it flows through the openings $b^5$ and the collecting-chamber $b^6$ into the flue $b^7$. The initial part of the air-tube G is located in the flue $b^7$ for the purpose of heating the air economically by means of the heating-gases flowing into the chimney. The inlet-pipe C of the retort is connected with the steam-pipe J by means of the stop-cock $i$. The outlet-pipe D may be connected successively during the process by means of the stop-cocks $k$ $l$ $m$ with the outlet-pipe K for steam during the drying process, with the outlet-pipe L for the products of dry distillation during the coking, and with the pipe M for the mixture of water, gas, and air during the steaming. We can also use to advantage a water-reservoir instead of the dust-collector $d$ to free the gases of the steaming process of dust, precaution being taken that the water can under no circumstances enter the retort.

As shown in Fig. 1$^a$, the reservoir $d'$ is divided in two equal parts by means of a partition $d^2$ extending into the water. The gases enter the reservoir $t$ and flow out at $t'$, while $d^3$ indicates a perforated plate of sheet metal serving for bursting the larger gas-bubbles and to offer a surface as large as possible to the washing which occurs within the water-column traversed by the bubbles.

When the pressure of the gas commences to produce an effect at $t$, the water-level will have two different elevations, as shown in Fig. 1$^b$, the gas entering through the perforated sheet-metal plate $d^3$, where the larger bubbles will burst, and thereafter it passes through the water-column $x$ and escapes at $t'$. The dust precipitates into the reservoir $d'$ and is removed from there from time to time through an opening which may be closed by a manhole-cover. If the pressure at $t$ becomes less than that at $t'$, the difference of the two water-levels will be reversed (see Fig. 1$^c$)—that is, instead of rising at the left the water will rise at the right of the partition at an elevation equal to $x$, and atmospheric air or gas will pass from $t'$ through the perforated plate $d^3$ and the water-column $x$ and continue to enter the retort until the pressure is compensated or until a higher pressure exists at $t'$ than at $t$ by the newly-generated gas.

In order to prevent an increase of the quantity of water by condensation, the overflow apparatus (shown in Fig. 1$^d$) is provided. It consists of the pipe $r$, connected with the reservoir $d'$, which issues in a second pipe $s$, which is at least as high as the highest elevation that can be reached by the water-column. When the water rises higher than the point $x$ it will run out through $r$ into the pipe $s$ and will be driven upward therein with a pressure corresponding to the pressure existing in $t'$. The water runs out at the point $s'$, and the quantity thereof that runs out into the vessel $u$ will be equal to that which has accrued in the apparatus by condensation. The vessel $u$ contains sulfuric acid for absorbing the free ammonia or carbonate of ammonia that may be let into the water.

For larger retorts it is advisable to wash the gas several times, and this is illustrated in Fig. 1$^e$. Here a series of partitions $d^4$ are inserted in addition to the partitions $d^2$, which do not touch the cover of the reservoir $d'$, but leave full space for the passing of the gas. These partitions $d^4$ plunge considerably deeper in the water than the partition $d^2$ and come so high above the said water that they are higher than the elevation $x$, which is caused by the pressure. The gas passing through the water will also pass through the perforated plates $d^3$ between the partitions $d^2$ $d^4$, and the dust which has been carried along after the first washing will be removed by the second washing, and so on. As the quantity of water remains the same and as the separate cells are connected, the entire mass of water will soon be saturated with ammonia, which, however, will be driven out because the water will be heated by the gases.

Inasmuch as the conduit-pipe J is used only during the third phase of the process, the conduit-pipe K only during the first phase, the pipe L only during the second, and M only during the third phase, the operation of the retort is not a continuous operation. In order to make the same continuous, a number of retorts are arranged as a battery. Fig. 2 shows a diagrammatic view of such a battery comprising 6 retorts, as an instance, while Fig. 3 is a longitudinal section through one of the ovens. The arranging of the retorts in a closed circle, as in Fig. 2, facilitates the inspection of the pipes.

The conduit-pipes H, J, K, L, and M are arranged in a battery as a closed circular conduit, connected with each retort. We also provide for the passage of the steam generated by the drying process through the conduit K to the superheater R, and from thence into the conduit J, so that the generating of superheated steam requires only the heat necessary for the superheating. The superheater is heated by means of gas from the conduit H, and the waste gases are used for heating the dust-collectors $d$ of the different retorts, passing through the pipe T to each retort before entering chimney S or the smoke-pipe P. Starting from the chamber $b^7$ each oven is in connection with the common smoke-pipe P, which connection can be cut off by means of a valve $p$. Said smoke-pipe P is arranged between the last oven and the chimney for heating the combustive air, and this air flows through the pipe G into the separate ovens. In order to be able to heat one oven with the waste gases of another or in succession, a series of other ovens, each oven starting from the chamber $b^7$, is connected with the next oven by means of a pipe N, which can be shut off by means of a valve. In order that the successive heating of the ovens from one fireplace be not limited to the ovens in the immediate vicinity, but that one or more ovens can be passed—for instance, those that must not be heated or must remain out of operation—a pipe O is arranged, which makes the circuit of all the ovens, and with this pipe the chamber $b^7$ is connected in such a manner that it can be shut off by a valve $o$. If, for instance, it is required to convey the heating-gases of the first oven to the third, passing the second oven, the valves $n$ and $p$ in the first oven are kept closed and the valve $o$ open, and in the second oven the valve $p$ is closed and the valves $o$ and $n$ open, so that the gases starting from the valve $o$ of the first oven reach the chamber $b^2$ of the third oven, passing through the pipe $o$, through the valves $o$ and $n$ of the second oven, and through the transmission-pipe N. Of course care must be taken that air does not enter from the pipe G into the second oven, as this must also be the case, more or less, with the third oven heated by the waste gases of the first oven.

It is desirable that one of the retorts constituting the battery be in the stage of being emptied and of being filled again. Part of the others must be in the stage of the drying, another part in the coking stage, and a third part in the stage of the steaming. The coking process will generally require so little time that one retort in that stage will generally be sufficient, while the drying process and the steaming process will have to occur simultaneously in several retorts, the former according to the contents of water in the material and the latter according to the nitrogen in the same, said process being gradual from the first stage to the last.

We have supposed in the drawings that the retort $A^6$ is empty and being filled again; that the drying process is effected in the retort $A^5$ and the dry distillation in the retort $A^4$ while the retort $A^3$ is in the first stage of steaming, the retort $A^2$ in the second stage, and the retort $A'$ in the final stage thereof. As can be seen by the arrows in the ovens, the retort $A'$ is heated directly because the separating of the last vestiges of nitrogen requires the most heat. The waste gases will then distribute their latent heat successively into both steaming-retorts $A^2$ and $A^3$ and to the coking retort $A^4$. The drying-retort $A^5$ is again heated independently and directly. The stop-cocks are shown closed or open by the direction of the parallel lines on the face of the circles representing the cocks. It is not intended to feed each of the three steaming-retorts separately by superheated steam from the conduit J, but that the superheated steam be let into the retort $A'$, and the generated mixture of steam, water, gas, and ammonia which flows out of the same be used for steaming the retort $A^2$ by means of the conduit Q, provided with a stop device $g$, which connects the pipe D of each retort with the inlet-pipe C of the next following, and that the gaseous product of that retort be allowed to pass into the retort $A^3$, from which a mixture of water, gas, and ammonia flows into the conduit M, and so on.

What we claim, and desire to secure by Letters Patent of the United States, is—

1. An apparatus for treating nitrogenous substances, comprising an oven, a retort and a feeding-screw in said retort extending outside the same within a casing and a socket in said casing for feeding or discharging the material, substantially as described.

2. A plant or apparatus for treating nitrogenous substances comprising a series of ovens, a retort in each oven, means for heating any of said ovens, a steam-inlet for each retort with means for controlling the flow of steam, an outlet-pipe from each retort and a pipe extending from the outlet-pipe of one retort to the steam-inlet pipe of the next retort, substantially as described.

3. In combination, the series of ovens having heating means, a retort in each oven, an inlet-pipe $c$ and an outlet-pipe D for each retort, pipes K, L, and M, connected with the outlet-pipes of all the retorts and provided with suitable cut-off valves, and a pipe Q from the outlet-pipe D of each oven to the inlet-pipe C of the next succeeding oven, substantially as described.

4. An apparatus for treating nitrogenous substances comprising an oven, a rotatable retort in it, a hollow socket communicating with the retort and having an eccentric mouth with regard to the axis of the retort, inlet and discharge conduits having openings in the path of the mouth of said socket and means to convey the substances from the socket into the retort and vice versa substantially as described.

5. An apparatus for treating nitrogenous substances comprising an oven, a rotatable retort in it, a hollow socket communicating with the retort and having an eccentric mouth with regard to the axis of the retort, inlet and discharge conduits having openings in the path of the mouth of said socket and means to convey the substances from the socket into the retort and means to connect air-tight the inlet and outlet conduits with the socket.

In testimony whereof we have signed our names to this specification in the presence of two subscribing witnesses.

CHRISTIAN FELLNER.
JOHANN STEIMLE.

Witnesses as to Christian Fellner:
ROBERT LÖHNDORFF,
FRANK W. MASON.

Witnesses as to J. Steimle:
CHARLES H. DAY,
HENRY HASPER.